Oct. 15, 1940.  G. T. JOHNSON  2,217,682
RAILWAY CAR TRUCK
Filed Feb. 18, 1938  4 Sheets-Sheet 1

Inventor
George T. Johnson,
By Seymour, Bright & Nottingham
Attorneys

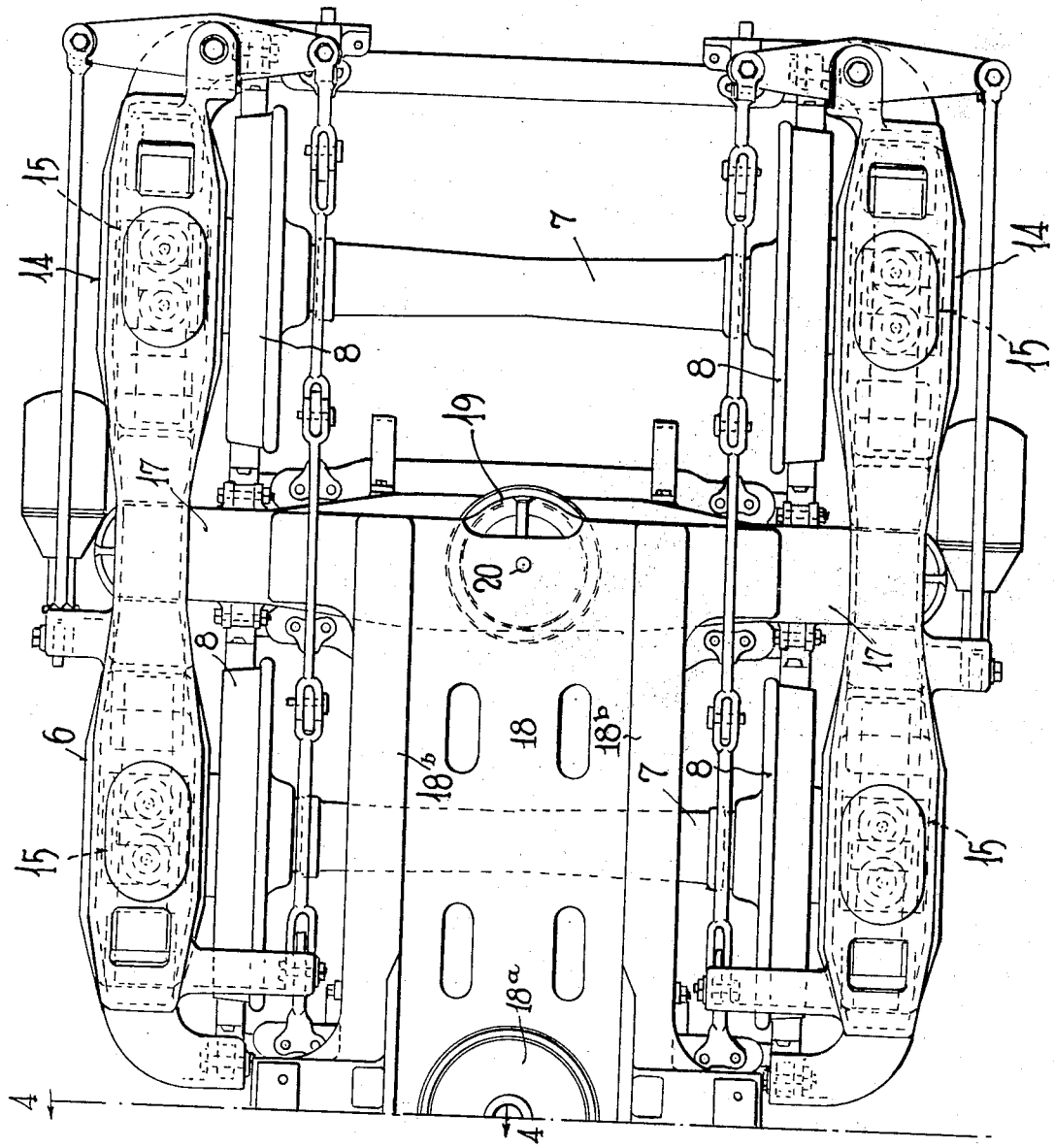

Oct. 15, 1940.   G. T. JOHNSON   2,217,682
RAILWAY CAR TRUCK
Filed Feb. 18, 1938   4 Sheets-Sheet 3
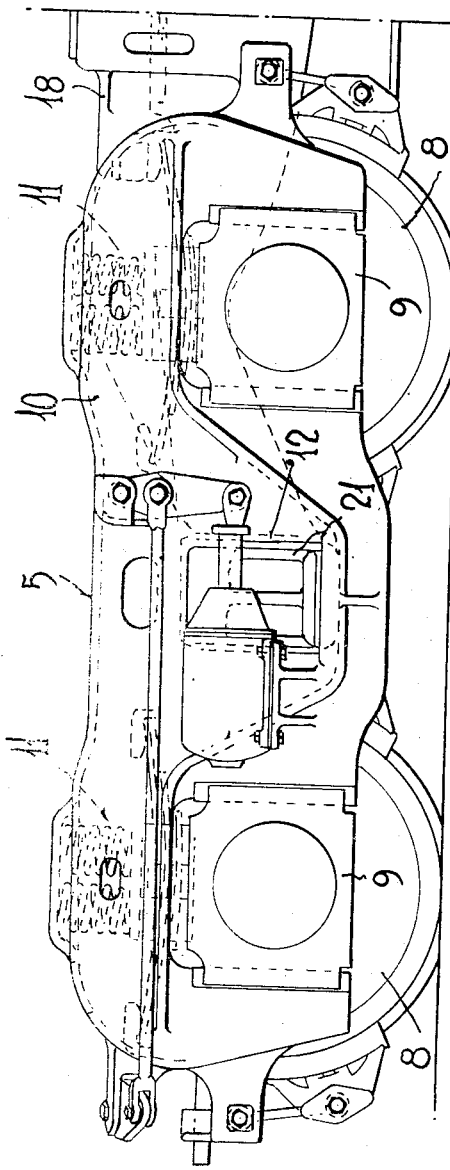
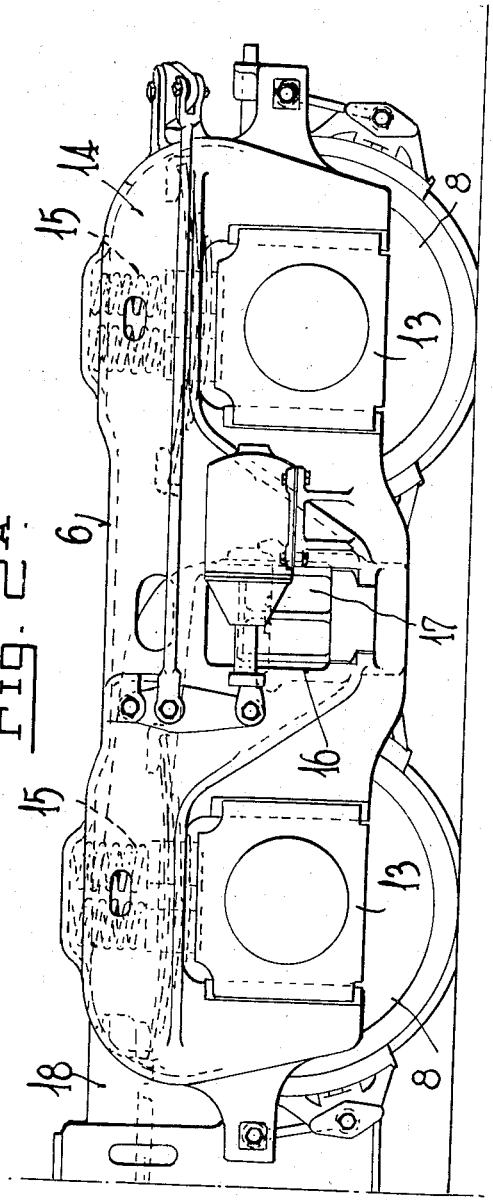
Inventor
George T. Johnson,
Seymour, Bright & Nottingham
Attorneys Oct. 15, 1940.　　　　G. T. JOHNSON　　　　2,217,682
RAILWAY CAR TRUCK
Filed Feb. 18, 1938　　　　4 Sheets-Sheet 4

Inventor
George T. Johnson,

By Seymour, Bright & Nottingham
Attorneys

Patented Oct. 15, 1940

2,217,682

UNITED STATES PATENT OFFICE 2,217,682

RAILWAY CAR TRUCK

George T. Johnson, Columbus, Ohio, assignor to The Buckeye Steel Castings Company, Columbus, Ohio Application February 18, 1938, Serial No. 191,297

4 Claims. (Cl. 105—183)

This invention relates to improvements in railway car trucks, and more particularly to a novel truck construction having more than four wheels.

At the present time, heavier equipment and higher train speeds make it desirable to decrease the load concentrations at the wheels, and this situation is leading to the development of trucks using more wheels and axles per truck. Lighter wheel loads result in greater economy and efficiency due to reduced maintenance cost, especially in high speed service.

The primary purpose of the present invention is to furnish a novel truck having improved means for mounting the bolster structure on the side frames.

A further object is to supply, in equipment of this character, a novel span bolster.

Another object is to provide a truck of this character with a span bolster, which is pivotally supported at one end directly upon the side frame members, of a four wheel truck unit in which the transverse bolster is omitted.

With the foregoing objects outlined and with other objects in view, the invention consists in the novel features hereinafter described in detail, illustrated in the accompanying drawings, and more particularly pointed out in the appended claims.

In the drawings:

Fig. 1A is a similar view of the other half.

Fig. 2 is a side elevation of the structure shown in Fig. 1.

Fig. 2A is a similar view of the structure illustrated in Fig. 1A.

Figure 1:
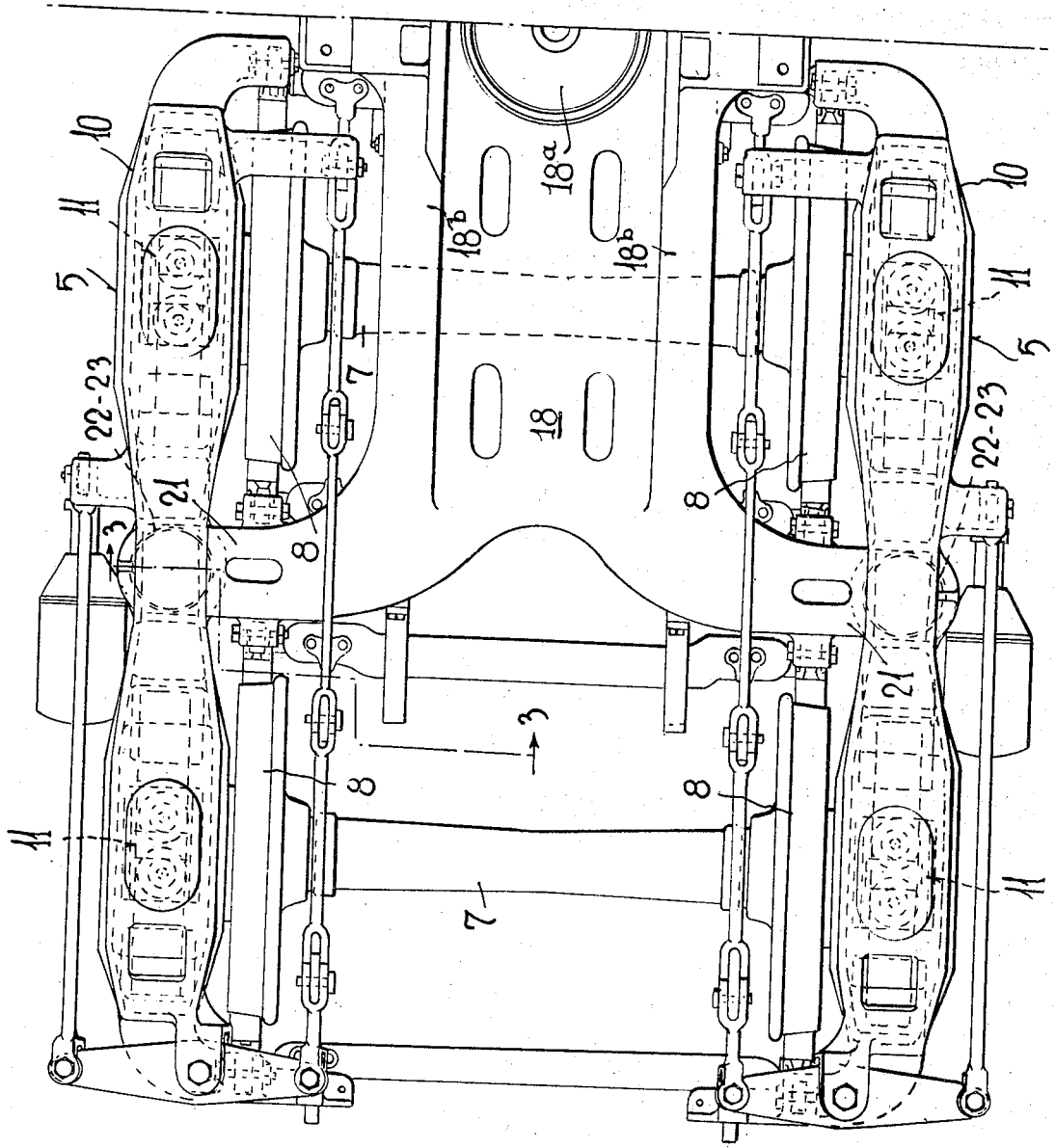
Fig. 1 is a top plan view of one half of my improved truck.

Referring to the drawings, 5 and 6 designate respectively four-wheel truck units. Each unit consists of two axles 7 supported by wheels 8. The axles of the unit 5 support journal boxes 9 which in turn support side frame members 10 through the medium of spring suspension means 11. Each side frame member has a bolster opening 12.

The axles of the unit 6 support journal boxes 13 which in turn support side frame members 14 through the medium of spring suspension means 15. Each of the side frame members 14 also has a bolster opening 16 into which extends an end of a transverse bolster 17 which may rest directly on the side frame member.

In accordance with my invention the truck units are connected by a span bolster 18, which bears at one end upon a center plate 19 of the transverse bolster 17 to permit relative movement between the span bolster and unit 6 about the vertical axis 20.

Figure 3:
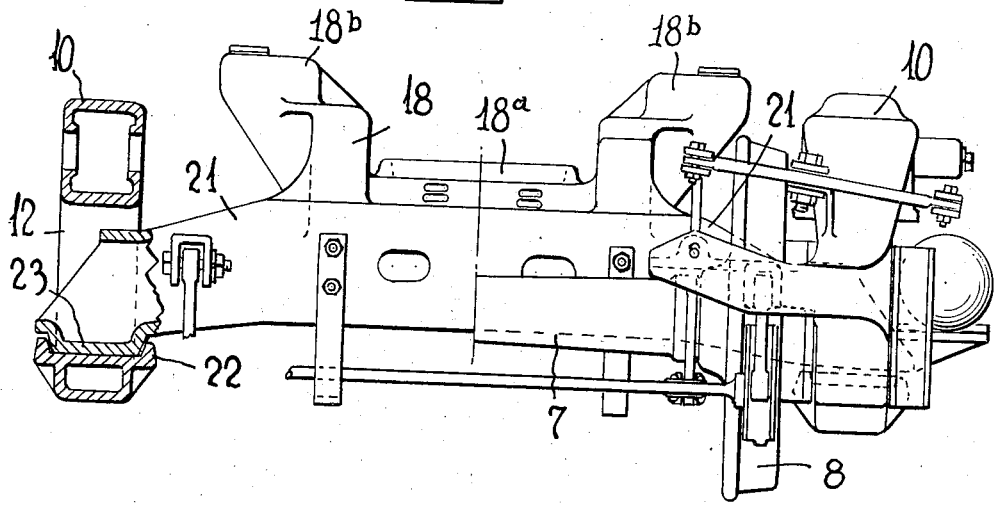
Fig. 3 is an end view of the truck viewed from the left end of Fig. 1 and partly in vertical transverse section, the section being taken on the line 3—3 of Fig. 1.
Figure 4:
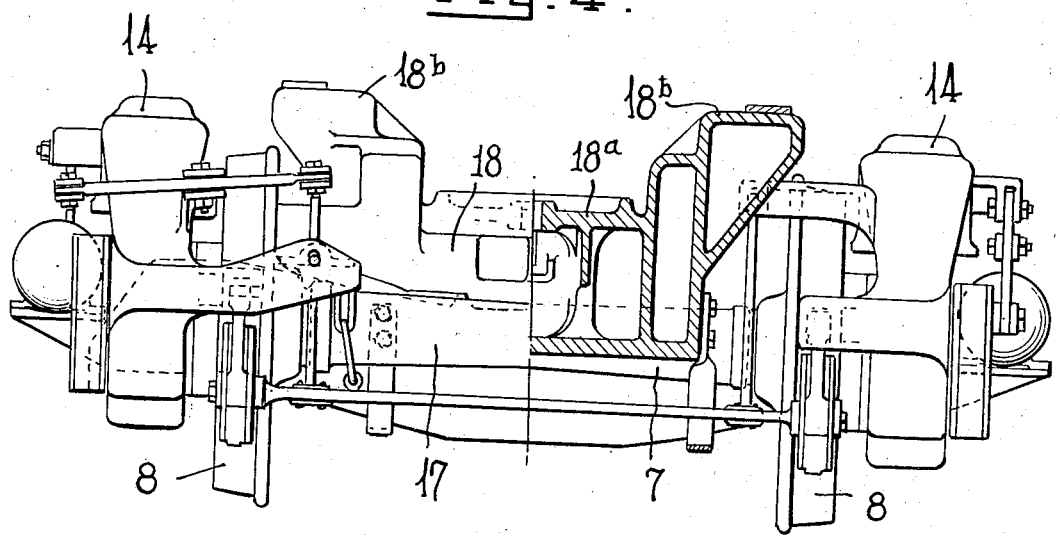
Fig. 4 is an end view of the truck looking from the right-hand end of Fig. 1A and partly in transverse vertical section, the section being taken on the line 4—4 of Fig. 1A.

The opposite end of the span bolster is provided with outwardly or laterally extending arms 21 which extend into the bolster openings 12 of the unit 5 and are pivotally connected to such unit, as best shown in Fig. 3. In this figure, it will be noted that each side frame member 10 is provided a circular pocket 22 to receive a correspondingly shaped projection 23 of the arm 21. Due to this construction, each arm rests on one of the side frame members 10 and each of these side frame members is free to swing about the axis of the circular parts 22 and 23. This pivotal connection of span bolster to side frame members permits the bolster to rotate in a horizontal plane when the truck negotiates a turn.

The span bolster is also provided with a medial top center plate 18a and upper side bearings 18b arranged at opposite sides thereof.

Means for providing horizontal swivel in the four-wheel unit 6 at the other end of the truck is, of course, formed by the parts shown at 19.

While I have shown the above described improvements in connection with an eight-wheel truck, for example, of the types disclosed in the application of Jerome G. Bower, Serial No. 191,308, filed on even date herewith, the construction 21, 22, 23, may also be applied to either or both ends of a center bolster of a six-wheel truck of various designs, and particularly to six-wheel trucks of the equalizer types.

From the foregoing it is believed that the construction, operation and advantages of the invention will be readily appreciated by those skilled in the art, and I am aware that changes may be made in the details disclosed without departing from the spirit of the invention as expressed in the claims.

What I claim and desire to secure by Letters Patent is:

1. A multi-unit railway car truck comprising wheel-supported side frame members having bolster openings, a transverse bolster extending into the bolster openings of opposite side frame members of one unit and supported by the latter, a span bolster having one of its ends pivotally supported by the transverse bolster for movement about a vertical axis arranged midway between the last-mentioned side frame members, the opposite end of the span bolster being provided with laterally extending arms which project into the bolster openings of the side frames of the other unit, and are supported by the last-mentioned side frames, each of the last-mentioned side frames being free to turn about a vertical axis relatively to one of said arms, said span bolster having a medial top center plate and upper side bearings at opposite sides thereof.

2. A multi-unit railway car truck having side frame members provided with bolster openings, a transverse bolster forming part of one of said units and having its ends extending into the bolster openings of that unit, a span bolster connecting said units and having a medial center plate and side bearings on its top surface and means for engaging the transverse bolster at one end, and arm portions forming part of said span bolster and extending into the bolster openings of the other unit and connected to the side frame members of the last-mentioned unit by means of articulated joints, each joint comprising cooperating socket and projecting portions to allow a side frame member to swing about a vertical pivot relatively to one of the arms.

3. A multi-unit railway car truck having side frame members provided with bolster openings, a transverse bolster forming part of one of said units and having its ends extending into the bolster openings of that unit, a span bolster connecting said units and having a medial center plate and side bearings on its top surface and means for engaging the transverse bolster at one end, and arm portions forming part of said span bolster and extending into the bolster openings of the other unit and connected to the side frame members of the last-mentioned unit by means of articulated joints, each side frame member of the last-mentioned unit being provided with a socket having curved walls struck from a vertical axis, and each arm having a downwardly projecting portion extending into one of the sockets and having walls complementary to those of the curved walls of the socket, said sockets and downwardly projecting portions forming the articulated joints.

4. A multi-unit railway car truck having substantially identical side frame members provided with bolster openings, a transverse bolster forming part of one of said units and having its ends extending into the bolster openings of that unit, a plurality of wheels and axles supporting each unit, a span bolster connecting said units and having one of its ends pivotally connected to the transverse bolster for movement about a vertical axis, and arms provided at the other end of the span bolster and extending into the bolster openings of the other unit and connected to the side frame members of the last-mentioned unit for movement about vertical axes.

GEORGE T. JOHNSON.